United States Patent
Cao (10) Patent No.: US 12,493,232 B2
(45) Date of Patent: Dec. 9, 2025

(54) PROJECTING WITH EXPANDED FIELD OF ILLUMINATION

(71) Applicant: ams-OSRAM Asia Pacific Pte. Ltd., Singapore (SG)

(72) Inventor: Yi Yu Cao, Pudong New District (CN)

(73) Assignee: AMS-OSRAM ASIA PACIFIC PTE. LTD., Singapore (SG)

( * ) Notice: Subject to any disclaimer, the term of this patent is extended or adjusted under 35 U.S.C. 154(b) by 392 days.

(21) Appl. No.: 18/248,699

(22) PCT Filed: Oct. 6, 2021

(86) PCT No.: PCT/SG2021/050602
§ 371 (c)(1),
(2) Date: Apr. 12, 2023

(87) PCT Pub. No.: WO2022/081086
PCT Pub. Date: Apr. 21, 2022

(65) Prior Publication Data
US 2023/0393453 A1    Dec. 7, 2023

(30) Foreign Application Priority Data
Oct. 15, 2020 (DE) .................... 10 2020 127 181.6

(51) Int. Cl.
G03B 21/14    (2006.01)
G02B 27/10    (2006.01)

(52) U.S. Cl.
CPC .................... *G03B 21/14* (2013.01)

(58) Field of Classification Search
CPC .... G03B 21/14; G03B 21/2013; G03B 21/00; G03B 21/13; G02B 27/10; G02B 3/0056; G02B 19/0028
See application file for complete search history.

(56) References Cited

U.S. PATENT DOCUMENTS

| 2013/0229810 A1 | 9/2013 | Pelka et al. |
| 2014/0146290 A1 | 5/2014 | Sieler et al. |

FOREIGN PATENT DOCUMENTS

| JP | 2008096761 A | 4/2008 |
| JP | 2014515126 A | 6/2014 |

OTHER PUBLICATIONS

Japanese Notification of Reason for Refusal issued in corresponding Japanese Patent Application No. 2023-517270 mailed on Apr. 16, 2023, with English language translation, 4 pages.

(Continued)

*Primary Examiner* — Ryan D Howard
(74) *Attorney, Agent, or Firm* — MH2 Technology Law Group LLP (57) ABSTRACT

An optical device includes an imaging system provided to generate a plurality of images being distributed over an imaging plane. It further includes a micro-lens-array, MLA, wherein micro-lenses are assigned to individual images and are provided to form channels of light beams by projecting the individual images towards a projecting plane. An optical expander is arranged between the MLA and the projecting plane and includes an input surface and least two output surfaces. The optical expander is provided to fan out and direct the channels of light beams onto the projecting plane, such that individual projections of the individual images are formed on the projection plane. An overall projection is formed on the projection plane by superimposing the individual projections.

15 Claims, 5 Drawing Sheets

(56) References Cited

OTHER PUBLICATIONS

International Search Report and Written Opinion in corresponding International Application No. PCT/SG2021/050602 mailed on Jan. 18, 2022, 9 pages.

Sieler et al., "Microlens array based LCD projection display with software-only focal distance control", Proc. of SPIE, vol. 8643, 2013, 29 pages.

PROJECTING WITH EXPANDED FIELD OF ILLUMINATION

CROSS-REFERENCE TO RELATED APPLICATIONS

The present application is the national stage entry of International Patent Application No. PCT/SG2021/050602, filed on Oct. 6, 2021, and published as WO 2022/081086 A1 on Apr. 21, 2022, which claims the benefit of priority of German Patent Application No. 10 2020 127 181.6, filed on Oct. 15, 2020, the disclosures of all of which are incorporated by reference herein in their entireties.

FIELD OF THE INVENTION

The present disclosure relates to an optical device, an optical apparatus and a method for forming an overall projection.

BACKGROUND OF THE INVENTION

Usually, the projection of dynamic images on screens is based on projection devices with one imaging optical channel. However, at least when it comes to projecting on inclined or curved surfaces, such devices suffer from several drawbacks: For an inclined surface, a sharp image could be achieved by extensive tilting of object and projection optics. This approach fails for curved projection surfaces. Moreover, the tilting increases the required installation space, which is contrary to the desire for miniaturization. An increased F-number (focus length/aperture size) could solve the problem by increasing the depth of focus, but such an increased F-number is usually accompanied by a lower light intensity.

For projection on inclined and curved surfaces it is therefore advantageous to use multi-channel optics, such as micro-lens arrays (MLA). In this case, a plurality of individual images is projected onto the screen by means of the MLA and superimposed. Distortions of the overall projection can be compensated by the fact that the individual images have basically the same image content but can be distorted in relation to each other and to the overall projection. On the one hand, this approach enables a compact design, since the focal length of the micro-lenses is usually smaller than those of the single-channel optics. On the other hand, multi-channel optics exhibit the necessary optical depth of focus anyway to realize a sharp projection on a curved or tilted projection surface.

A disadvantage of multi-channel optics, however, is the relatively limited field of illumination (FOI). Here and in the following FOI is defined as the width of the light cone emanating from the optics. The larger the half cone angle of the light cone, the larger the total projection on the screen can be. Therefore, to enable larger projections, larger/more MLAs are required. However, this in turn leads to increasing production costs, higher complexity and high alignment effort.

Therefore, an object to be achieved is to provide an optical device for forming an overall projection which exhibits an increased field of illumination. It is further an object to provide a method for forming an overall projection with an increased field of illumination.

This object is achieved with the subject-matter of the independent claims. Embodiments and developments of the optical device are defined as the dependent claims.

SUMMARY OF THE INVENTION

In an embodiment the optical device comprises an imaging system provided to generate a plurality of images being distributed over an imaging plane.

The imaging plane is a plane where the images are generated. The imaging system may be a transmissive imaging system. This means that the imaging system can operate in a transmissive mode. In this case, the imaging system comprises, for example, a pattern mask which shows a variation in its transmissivity in lateral directions. Lateral directions run parallel to a main plane of extension of the imaging plane. The pattern mask is arranged in the imaging plane. The pattern mask can be illuminated by a light source, wherein the light source can be comprised by the imaging system. The plurality of images is generated in the imaging plane by portions of light, which is transmitted by the pattern mask. A transmissive imaging system will be described below in more detail.

The imaging system may also be an emissive imaging system. In this case, the imaging system comprises, for example, a self-luminous display, which is arranged in the imaging plane. For example, the self-luminous display is a display comprising a plurality of light emitting diodes (LED). By activating groups of the LEDs a plurality of images is generated in the imaging plane.

Furthermore, the imaging system may also be a reflective imaging system. In that case the imaging system may comprise reflective structures arranged in the imaging plane. The reflective structures are illuminated by a light source such that light is reflected by the reflective structures. Portions of the reflected light form a plurality of images in the imaging plane.

The imaging plane extends in lateral directions. The images can be distributed over the imaging plane in one or more lateral directions. Moreover, the images can be distributed over the imaging plane in a regular or irregular way, which means that distances between neighboring images can be constant or varying. The images, or at least subsets of the images, may have essentially the same contents. They may all represent one version of an overall image. However, the images can also differ from each other. Possibly, the images are distorted with respect to each other and to the overall image.

The optical device further comprises a micro-lens array (MLA), wherein micro-lenses of the MLA are assigned to respective individual images of the plurality of images.

The MLA can have a main plane of extension which is parallel to the main plane of extension of the imaging plane. The MLA comprises a plurality of micro-lenses which are arranged in an array. The array can be regular or irregular in terms of positions of the micro-lenses within the array.

In a preferred embodiment, each micro-lens is assigned to one individual image of the plurality of images. However, it is also possible that a group of micro-lenses is assigned to one individual image, or that each micro-lens is assigned to a group of individual images.

The micro-lenses of the MLA are provided to form respective channels of light beams by projecting the respective individual images towards a projecting plane.

The projecting plane is a plane where projections of the individual images are generated. The projecting plane has a main plane of extension that might be parallel to the main plane of extension of the imaging plane. However, in a preferred embodiment the projecting plane is tilted with respect to the imaging plane. It is also possible that the projecting plane is not a flat plane but a freeform surface.

The micro-lens that is assigned to the respective individual image, projects each point of that individual image towards the projecting plane. That means that each point of the image is projected towards the projecting plane by means of a light beam. The projected individual image therefore forms the channel of light beams.

The optical device further comprises an optical expander, which is arranged between the MLA and the projecting plane. The optical expander comprises an input surface facing the MLA and at least two output surfaces facing the projecting plane.

The optical expander may comprise a material which is transparent for light in the wavelength range of interest. Here and in the following "transparent" refers to a transparency of at least 80% or at least 90%. For example, the optical expander comprises glass. In another embodiment the optical expander comprises plastic such as polycarbonate (PC), polymethylmethacrylat (PMMA), silicone or epoxy.

The optical expander is arranged between the MLA and the projecting plane such that channels of light beams coming from the MLA pass through the optical expander before reaching the projecting plane. The input surface of the optical expander faces the MLA and receives the channels of light beams. The input surface may be parallel to the main plane of extension of the MLA. It is however also possible that the input surface of the optical expander is tilted with respect to the MLA. The at least two output surfaces of the optical expander face the projecting plane. They may be parallel or tilted with respect to the input surface. The output surfaces may direct the channels of light beams, which passed through the optical expander, onto the projecting plane.

The optical expander is provided to fan out and direct the channels of light beams onto the projecting plane, such that individual projections of the individual images are formed on the projection plane by the channels of light beams directed onto the projection plane.

This means that the optical expander expands the field of illumination, which is formed by the channels of light beams. In other words, the optical expander is provided to direct channels of light beams in directions that are further away from an optical axis of the optical device.

The channels of light beams are directed onto the projecting plane and form individual projections of the individual images. This means that each individual image leads to an individual projection on the projecting plane. The individual projections may overlap. However, at least some individual projections may also be separated from each other.

An overall projection is formed on the projection plane by superimposing the individual projections at least partially.

At least some points of the individual images, which are directed and projected onto the projecting plane, are superimposed in a respective common point of the overall projection. However, there might be at least one individual projection which is not superimposed with at least another individual projection in the sense that they share no common point with each other. It is also possible that only some points of an individual projections are superimposed with some further points of another individual projection.

An advantage of that embodiment is that the optical device can have small dimensions. Due to the assignment of micro-lenses to individual images, it is possible to reduce the distance between the imaging plane and the projection optics, i.e. the MLA. This is because each micro-lens of the MLA has a small focal length compared to conventional projecting optics. Therefore, the installation length can be reduced, which leads to miniaturization of the system. While a short overall length of the optical device results from the focal length of the micro-lenses, the plurality of micro-lenses ensures a proportional increase in image brightness.

A further advantage is that the optical device can be used for generating an overall projection on tilted, curved or freeform surfaces. This is because the imaging system can be designed in such a way that constellations of points in the individual images, each superimposed in a respective common point in the overall projection, differ depending on the distance of the respective common point in the overall projection from the MLA. In other words, if the projecting plane in inclined, distortion of the overall projection can be compensated by realizing each individual image differently, though each individual image may still have essentially the same content. This means, the individual images may be distorted with respect to each other.

By using the optical expander, the FOI can advantageously be expanded. Without optical expander the MLA leads to a limited FOI and the size of the overall projection depends on the FOI. In such systems the light cone has a half cone angle of about 10.5 degree. By fanning out the channels of light beams by means of the optical expander the half cone angle can be increased up to 30 degree, by way of example. Therefore, a wider overall projection can be realized. Although the optical expander causes a deformation of the overall projection, this deformation can be compensated by designing the individual images in an appropriate way. Thus, using the optical expander is especially suited for MLA applications that use various channels of light beams. Advantageously, the optical expander can be produced very cost-effective. In case of using plastic as material, the optical expander can be produced by conventional molding techniques.

In some embodiments of the optical device the optical expander is arranged such that the input surface is parallel to the imaging plane and receives the channels of light beams coming from the MLA.

The input surface and the MLA can be aligned with respect to each other, such that all channels of light beams are received by the input surface. Therefore, the lateral extent of the input surface can be equal or larger than the lateral extent of the MLA. The MLA and the input surface might be spaced. Advantageously, the optical expander can be mounted in front of the MLA, so that all channels of light beams are received and redirected by the optical expander.

In some embodiments the optical expander is arranged such that a first output surface of the optical expander is provided to direct a first subset of channels of light beams to a first subarea of the projecting plane, and a second output surface of the optical expander is provided to direct a second subset of channels of light beams to a second subarea of the projecting plane.

The channels of light beams received by the input surface propagate through the optical expander and exit the optical expander at its output surfaces. The channels of light beams are released at the output surfaces so that they can further propagate towards the projecting plane. This can mean that the first and second output surfaces deflect the first subset and the second subset of channels of light beams, respectively, in different directions. Deflection can occur, for example, by means of reflection, refraction or diffraction. However, deflection of the channels of light beams can also occur at the input surface or within the optical expander.

The first and the second subarea of the projecting plane can be different from each other. This means that the first and the second subarea can be spatially separated from each other in the projecting plane. However, the first and the second subarea can also overlap at least partially. Starting from the optical expander, the first subarea can be in a different direction than the second subarea. Advantageously, the first and the second output surface can be arranged in such a way that different subsets of channels of light beams can be directed in different directions.

In some embodiments the optical expander comprises at least one further output surface, which is provided to direct a further subset of channels of light beams to a further subarea of the projecting plane.

There might be more than one further subset of channels of light beams and more than one further subarea of the projecting plane, depending on the number of output surfaces. In some embodiments different output surfaces are provided to direct different subsets of channels of light beams to the same subarea of the projecting plane.

As mentioned above, this can mean that the at least one further output surface deflects the further subset of channels of light beams in a further direction. Deflection can occur, for example, by means of reflection, refraction or diffraction. However, deflection of the further subset of channels of light beams can already occur at the input surface or within the optical expander.

The further subarea of the projecting plane can be different from the first and the second subarea. This means that the further subarea can be spatially separated from other subareas. However, the further subarea can also overlap at least partly with other subareas. Starting from the optical expander, the further subarea can be in a different direction than other subareas. Advantageously, the first and the second output surface can be arranged in such a way that different subsets of channels of light beams can be directed in different directions.

In some embodiments at least one of the output surfaces of the optical expander is provided to direct the respective subset of channels of light beams by light beam refraction at the respective output surface.

Light beam refraction occurs according to Snell's law. Snell's law states that the ratio of the sines of the angles of incidence and refraction is equivalent to the ratio of phase velocities in the two media of interest, or equivalent to the reciprocal of the ratio of the indices of refraction of the two media. In this case, the first medium is the material used for the optical expander, for example glass. The second medium is the environment, for example air. The angles of incidence and refraction depend on the inclination of the respective output surface. Advantageously, directing subsets of channels of light beams towards a specific direction can be performed efficiently by means of light beam refraction.

In some embodiments the optical expander comprises further surfaces enabling total internal reflection of light beams within sections of the optical expander, such that at least one of the subsets of channels of light beams is deflected within the sections of the optical expander.

In general, total internal reflection (TIR) occurs when waves in one medium reach the boundary with another medium at a sufficiently slanting angle, provided that the second ("external") medium is transparent to the waves and allows them to travel faster than in the first ("internal") medium. This means that TIR takes place at the interface of two non-absorbent media with different velocities of propagation, if the angle of incidence exceeds a certain value, called critical angle of total reflection. A wave then no longer enters the second medium but is almost completely reflected into the first medium.

In this case the waves are electromagnetic waves in the visible range of wavelengths, i.e. light. The critical angle is determined by using Snell's law to be $\theta_c = \arcsin(n_2/n_1)$, where $n_2$ is refractive index of the second medium (e.g. air) and $n_1$ is the refractive index of first medium (e.g. material of the optical expander, glass). In order for TIR to occur, the refractive index of the first medium (material of optical expander) may be larger than the refractive index of the second medium (e.g. air). Moreover, the inclination of the further surfaces of the optical expander with respect the propagation of the channels of light beams may be such that the angle of incidence exceeds the critical angle.

The optical expander may have more than one further surface, where TIR of light beams is enabled. This means that light beams may deflected multiple times within the optical expander by TIR. This further means that channels of light beams are guided within the optical expander towards a respective output surface of the optical expander. By TIR the channels of light beams are deflected, so that the direction of the light beam propagation is changed. Advantageously, directing subsets of channels of light beams towards a specific direction can be performed efficiently by means of TIR. This way, the directions of respective subsets of channels of light beams can diverge even more than in case of light beam refraction at output surfaces.

In some embodiments at least one of the output surfaces of the optical expander is tilted with respect to the input surface of the optical expander.

This means that a normal vector of at least one output surface is not parallel to a normal vector of the input surface. However, there might be at least one output surface that is parallel to the input surface of the optical expander. Advantageously, by tilting at least one output surface with respect to the input surface of the optical expander, the direction, where subsets of channels of light beams are directed to, can be controlled.

In some embodiments at least two of the output surfaces of the optical expander are tilted with respect to each other.

This means that a normal vector of at least one output surface is not parallel to a normal vector of another output surface. However, there might be at least one output surface that is parallel to another output surface of the optical expander. Advantageously, by tilting at least two output surfaces with respect to each other, the directions, where subsets of channels of light beams are directed to, can be controlled independently.

In some embodiments the optical expander is provided for expanding the field of illumination, FOI, such that the overall projection on the projection plane is larger than the individual projections on one of the subareas of the projection plane.

As mentioned above, the FOI is defined by the width of a light cone that emanates from projecting optics and extends towards the projecting plane. The wider the light cone is, the larger the overall projection on the projection plane can be. The optical expander expands the FOI by fanning out the channels of light beams: the first subset of channels of light beams is directed to the first subarea of the projecting plane, while the second subset of channels of light beams is directed to the second subarea of the channels of light beams. It is noted that the first and the second subarea can be in different directions. The overall projection is therefore larger than each of the individual projections. In other words, the individual projections may cover only the respective subarea of the projecting plane, while the overall projection covers the sum of subareas.

As mentioned above, in conventional devices without optical expander the FOI is limited. In such systems the light cone has a half cone angle of about 10.5 degree. By fanning out the channels of light beams by means of the optical expander the aperture angle can be increased up to 30 degree, by way of example.

In some embodiments the imaging system comprises a pattern mask arranged in the imaging plane, the pattern mask providing individual images distributed over the imaging plane.

The pattern mask can be self-luminous, transmissive or reflective. In case that the pattern mask is self-luminous, the pattern mask can comprise an array of light sources like LEDs. By activating a first group of light sources a first pattern is generated, which forms a first individual image of the plurality of images. Analogously, by activating a second group of light sources, which is arranged at a distance to the first group of light sources, a second pattern is generated forming a second individual image. The pattern mask can comprise a plurality of groups of light sources. The distribution of groups of light sources on the pattern mask corresponds to the distribution of individual images over the imaging plane.

If the pattern mask is reflective it may comprise reflective structures. The reflective structures are illuminated by at least one light source from a front side of the pattern mask such that light is reflected by the reflective structures. The front side of the pattern mask faces the MLA. Portions of the reflected light form the plurality of images.

In case that the pattern mask is transmissive, it shows a variation in its transmissivity in lateral directions. The pattern mask can be illuminated by at least one light source, wherein the at least one light source can be comprised by the imaging system. The light source can illuminate the pattern mask from a rear side of the pattern mask, which means that the pattern mask is arranged between the light source and the MLA. The plurality of images is generated in the imaging plane by portions of light, which is transmitted by the pattern mask. The individual images could be realized binary-coded, gray-scaled or even color-coded. The transmissive parts of the pattern mask can be transmissive for the whole light spectrum. However, it is also possible that various transmissive parts of the pattern mask transmit light in a specific wavelength range, for example in the red, green or blue wavelength range. That respective transmissive parts of the pattern mask can vary their transmissivity for specific wavelength ranges is likewise possible.

The pattern mask may comprise a chrome layer, which is structured by means of a photolithographic process. If the pattern mask is illuminated from the rear side, light is blocked by the chrome layer and transmitted by those parts of the pattern mask, where the chrome layer is removed. Therefore, a plurality of patterns is generated by the transmitted light, wherein each pattern forms an individual image. The patterns or individual images, respectively, are spatially separated from each other such that they are distributed over the imaging plane. The individual images may be generated either in an analog or continuous or pixelated form.

By means of the pattern mask, especially a transmissive pattern mask, the plurality of images/patterns can be generated effectively. The pattern mask can be adjusted according to requirements of a specific application. For example, if a specific overall projection is desired, features of the individual images on the pattern mask can be calculated by tracing back to the pattern mask side.

In some embodiments the imaging system comprises a light source being provided to display the plurality of images.

In some further embodiments a plurality of light sources is provided. As mentioned above, the light source or the plurality of light sources may be arranged on the pattern mask (in case of a self-luminous, emissive imaging system), in front of the pattern mask (in case of a reflective imaging system) or behind the pattern mask (in case of a transmissive imaging system). Advantageously, the light source may emit light in the entire wavelength spectrum. However, a light source that emit mono-colored light is also possible. If multiple light sources are used, each light source can emit light in a specific wavelength range, so that the full RGB spectrum is emitted, for example.

In some embodiments the imaging system further comprises a collimator lens, and/or a condenser lens or an array of condenser lenses, wherein the collimator lens and the condenser lens or the array of condenser lenses being provided to form a beam path of the light source.

The collimator lens can be arranged between the light source and the imaging plane. Advantageously, the collimator lens is used to generate light with an approximately parallel beam path from a divergent light source. This means that the collimator lens can give the light a certain direction.

The condenser lens or the array of condenser lenses can be arranged between the collimator lens and the imaging plane. Advantageously, the condenser lens or the array of condenser lenses can bring as much as possible of the light of the light source into the imaging beam path and ensures that each individual image is uniformly illuminated.

In some embodiments the MLA further comprises a substrate, the substrate having a main plane of extension being parallel to the imaging plane and comprising a rear side facing the imaging plane and a top side facing the optical expander. The micro-lenses of the MLA are arranged on the top side of the substrate.

The substrate may comprise a transparent material such as glass. The micro-lenses of the MLA can be in direct contact with the substrate. If a pattern mask is used, it is possible to arrange the pattern mask on the rear side of the substrate, such that the front side of the pattern mask is in direct contact with the rear side of the substrate. The thickness of the substrate might be chosen depending on the focal length of the micro-lenses. This means that the distance between the micro-lenses and the imaging plane/the pattern mask may approximately correspond to the focal length of the micro-lenses.

If an array of condenser lenses is used, it is possible to arrange the array of condenser lenses on the rear side of the pattern mask, such that the array of condenser lenses is in direct contact with the rear side of the pattern mask.

Advantageously, the production of the optical device is facilitated by processing the substrate from both sides. Thus, the optical device can be compact and the overall system size can be reduced.

In some embodiments the projecting plane is tilted with respect to the imaging plane or wherein the projecting plane is a freeform surface.

However, in other embodiments the projecting plane is parallel to the imaging plane. The projecting plane may be a screen which is comprised by the optical device. That the projecting plane is formed by a wall or by the ground, which are not part of the optical device, is likewise possible.

Advantageously, the optical device can be adapted to any desired projecting plane. The multi-channel projection by means of the MLA allows to achieve an increased depth of focus of the individual projections. For the individual projections, it is therefore basically no problem if the projection plane has laterally a variable distance to the MLA.

Furthermore, an optical apparatus is provided, the optical apparatus comprising the optical device, wherein the optical apparatus is in particular an illuminator or a projector.

In particular, the optical apparatus may be used for any illumination modules and projection systems, for which a wide FOI is required. The optical apparatus can be used, for example, in automotive applications, such as welcome-light-carpets (WLC), interior ceiling light or wide view head lights. In case of WLCs, it could be desired that the WLC is projected perpendicular to the car door line. Accordingly, the WLC needs a larger FOI to enable the WLC to be closer to the door. However, the optical apparatus may also be used in domestic applications, for example for ceiling light projection. It is also possible to use the optical apparatus in mobile and smart devices such as for keyboard projection.

The object is further solved by a method for forming an overall projection. The method comprises generating a plurality of images, wherein the images are distributed over an imaging plane.

It further comprises assigning micro-lenses of a micro-lens-array, MLA, to respective individual images of the plurality of images and forming respective channels of light beams by projecting the respective individual images towards a projecting plane.

It further comprises providing an optical expander and arranging the optical expander between the MLA and the projecting plane, the optical expander comprising an input surface facing the MLA and at least two output surfaces facing the projecting plane, the optical expander fanning out and directing the channels of light beams onto the projecting plane.

The method further comprises forming individual projections of the individual images on the projection plane by the channels of light beams directed onto the projecting plane and superimposing the individual projections at least partly.

Advantageously, an overall projection can be generated on tilted, curved or freeform surfaces. Moreover, by using the optical expander the FOI can advantageously by expanded. Thus, a wider overall projection can be realized.

Further embodiments of the method become apparent to the skilled reader from the embodiments of the pixel arrangement described above.

BRIEF DESCRIPTION OF THE DRAWINGS

The following description of figures may further illustrate and explain exemplary embodiments. Components that are functionally identical or have an identical effect are denoted by identical references. Identical or effectively identical components might be described only with respect to the figures where they occur first. Their description is not necessarily repeated in successive figures.

DETAILED DESCRIPTION

Figure 1:
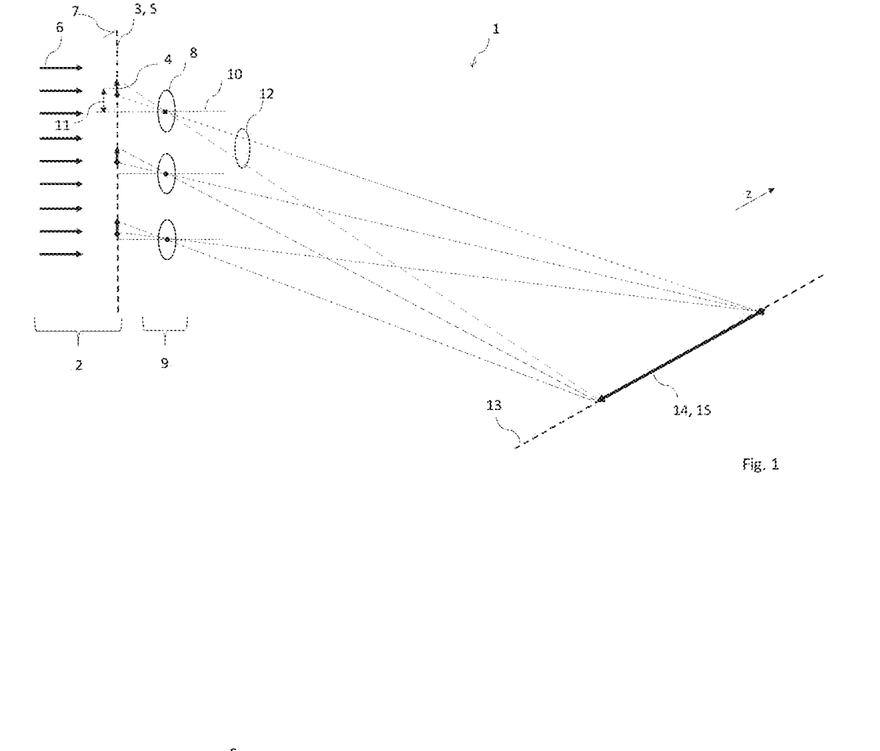
FIG. 1 shows a cross-section of an example of an optical device.

FIG. 1 shows a cross-section of an exemplary conventional optical device 1. The optical device 1 according to FIG. 1 comprises an imaging system 2 which generates a plurality of images being distributed over an imaging plane 3. FIG. 1 shows three individual images 4 as indicated by small arrows, however, the number is merely exemplary.

As indicated, the plurality of images could be generated by means of a transmissive pattern mask 5, which is arranged in the imaging plane 3. The pattern mask 5 is illuminated by a light source 40 (not shown), wherein collimated light beams 6 hit the pattern mask 5 from a rear side 7.

The optical device 1 further comprises a plurality of micro-lenses 8 of a micro-lens array (MLA) 9. FIG. 1 shows three micro-lenses 8, correspondingly to the number of individual images 4. In general, the number of individual images 4 can match the number of micro-lenses 8. The pattern mask 5, and therefore also the imaging plane 3, is arranged between the light source 40 and the MLA 9.

Each micro-lens 8 is assigned to one respective individual image 4 of the plurality of images. The micro-lenses 8 each have an optical axis 10, as indicated by dashed lines, which can have an offset 11 to the individual images 4. The resulting de-centration of the micro-lenses 8 with respect to the assigned individual images 4 is relevant for the projection distance.

Each micro-lens 8 is arranged such that it forms a respective channel of light beams 12 by projecting the respective individual image 4 on a projecting plane 13. Therefore individual projections 14 are formed on the projecting plane 13. In the example according to FIG. 1 each individual projection 14 is formed on the same portion of the projecting plane 13. An overall projection 15, as indicated by a large arrow, is formed on the projecting plane 13 by superimposing all individual projections 14.

All individual images 4 show a version of an overall image or the overall projection 15, respectively. As shown in FIG. 1, the projecting plane 13 is inclined with respect to the imaging plane 3. This means that a distance of the projecting plane 13 from the MLA 9 varies depending on the position at the projecting plane 13 in a longitudinal direction z. The longitudinal direction z is transverse to the imaging plane 3 and parallel to the projecting plane 13. In order to generate an overall projection 15 without distortion it might therefore be necessary that the individual images 4 slightly differ from each other. Thus, the individual images 4 might be pre-distorted with respect to each other and/or with respect to the overall projection 15. The pre-distortion, for example, corrects the distortion resulting from the divergence of the channels of light beams 12 of the individual images 4 or the magnification by the individual images 4.

Figure 2:
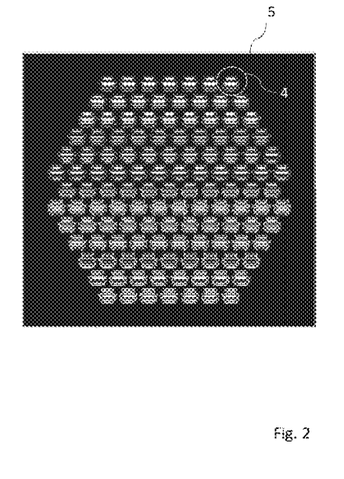
FIG. 2 shows a top-view of a pattern mask according to the example of FIG. 1.

FIG. 2 shows a top view of an exemplary pattern mask 5, which can be used in the optical device 1 according to FIG. 1. The pattern mask 5 can comprise, for example, a structured chrome layer. Those parts of the pattern mask 5, where the chrome layer is removed, are transmissive for light, while parts, of the pattern mask 5, where the chrome layer is still present, are opaque for light.

Therefore, by illuminating the pattern mask 5 from the rear side 7 a plurality of patterns is generated. In the example of FIG. 2 the patterns are arranged on a regular hexagonal grid. Each pattern is spaced from neighboring patterns such that the patterns are distributed over the pattern mask 5. Each pattern forms an individual image 4 in the imaging plane 3.

Figure 3:
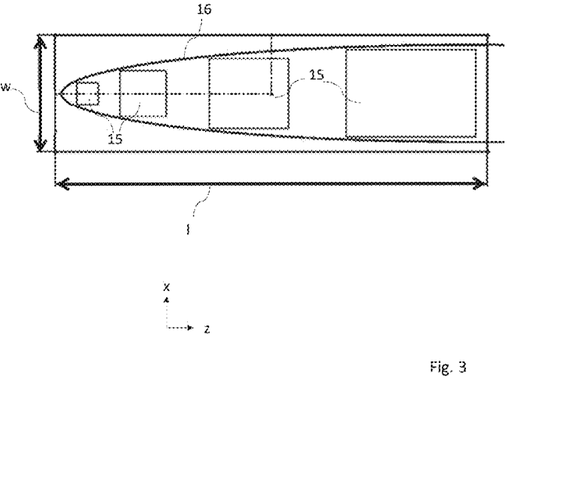
FIG. 3 shows an overall projection on an inclined surface according to the example of FIG. 1.

FIG. 3 shows the overall projection 15 according to the pattern mask 5 of FIG. 2. The overall projection 15 is projected on the projection plane, wherein the projection plane is tilted with respect to the imaging plane 3 (see FIG. 1). The overall projection 15 has a length l in the longitudinal direction z and a width w in a lateral direction x, wherein the lateral direction x may be parallel to the imaging plane 3. In this example, the overall projection 15 is formed by four rectangles, wherein the rectangles increase in the longitudinal direction. It is noted that each individual image 4, i.e. each pattern, shows a distorted version of the overall projection 15, as it can be seen in FIGS. 2 and 3. As mentioned above, that pre-distortion compensates the distortion caused by projecting on the inclined projecting plane 13. The overall projection 15 is generated by superimposing the individual projections 14 of the individual images 4.

FIG. 3 further shows the profile of a light cone 16 that is formed by the channels of light beams 12 projected onto the projecting plane 13 and generating the overall projection 15. It is noted that the width w of the overall pattern is limited to a width of the light cone 16, i.e. to the half cone angle of the light cone 16. Therefore, in the conventional optical device 1 according to FIGS. 1 to 3, the maximum width w of the overall projection 15 to be displayed is limited.

Figure 4:
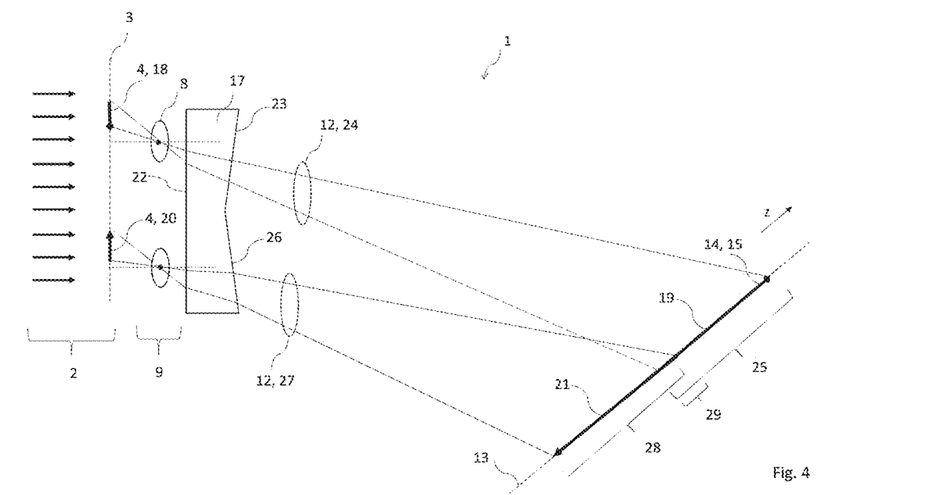
FIG. 4 shows a cross-section of an embodiment of an optical device.

FIG. 4 shows a cross-section of an embodiment of an optical device 1 comprising an optical expander 17. This means that the optical device 1 according to FIG. 4 differs from the example shown in FIG. 1 in that it further shows the optical expander 17, which is arranged between the MLA 9 and the projecting plane 13. Elements according to FIG. 4 that correspond to elements of the examples according to FIG. 1 are designated with the same reference numerals. FIG. 4 only shows two individual images 4, however, the number is merely exemplary. Correspondingly, FIG. 4 shows two micro-lenses 8 of the MLA 9, which form respective channels of light beams 12 by projecting the respective individual image 4 towards the projecting plane 13.

In the embodiment according to FIG. 4 the individual images 4 differ from each other not only in being distorted with respect to each other. A first subset 18 of individual images 4, which is represented by the upper individual image 4 shown in FIG. 4, shows versions of a first part 19 of the overall projection 15. This is indicated by a diamond shown in the upper individual image 4. A second subset 20 of individual images 4, which is represented by the lower individual image 4, shows versions of a second part 21 of the overall projection 15. This is indicated by an arrowhead in the lower individual image 4.

The optical expander 17 of the embodiment of FIG. 4 comprises an input surface 22 facing the MLA 9 and two output surfaces 23, 26 facing the projecting plane 13. The optical expander 17 is arranged such that the input surface 22 is parallel to the imaging plane 3 and receives the channels of light beams 12 coming from the MLA 9.

Moreover, the optical expander 17 is arranged such that a first output surface 23 of the two output surfaces 23, 26 directs a first subset 24 of channels of light beams 12 to a first subarea 25 of the projecting plane 13. The first subset 24 of channels of light beams 12 corresponds to the channels of light beams 12 which are formed by projecting the first subset 18 of individual images 4 by means of the MLA 9.

A second output surface 26 of the two output surfaces 23, 26 directs a second subset 27 of channels of light beams 12 to a second subarea 28 of the projecting plane 13, wherein the second subset 27 of channels of light beams 12 corresponds to the channels of light beams 12 which are formed by projecting the second subset 20 of individual images 4 by means of the MLA 9.

Starting from the optical expander 17, the first and the second subarea 25, 28 of the projecting plane 13 are in different directions. Thus, the optical expander 17 fans out the channels of light beams 12. Fanning out and directing the channels of light beams 12 may take place by light beam refraction at the output surfaces 23, 26. However, light beam refraction may already occur at the input surface 22 of the optical expander 17, as indicated in FIG. 4.

Individual projections 14 of the individual images 4 are formed on the projection plane by the channels of light beams 12 directed onto the projection plane. This means that the first subset 24 of channels of light beams 12 form individual projections 14 on the first subarea 25 of the projection plane 13, where these individual projections 14 are superimposed to the first part 19 of the overall projection 15. The second subset 27 of channels of light beams 12 form individual projections 14 on the second subarea 28 of the projection plane 13, where they are superimposed to the second part 21 of the overall projection 15.

In the embodiment of FIG. 4 the first and the second subarea 25, 28 of the projecting plane 13 are different but overlap. This means that in the overlap region 29 the first and the second subsets 24, 27 of channels of light beams 12 are superimposed with each other as well.

Figure 5:
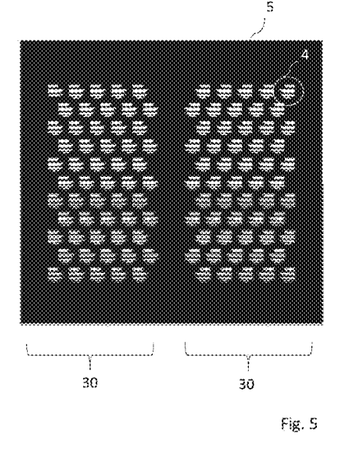
FIG. 5 shows a top-view of a pattern mask according to the embodiment of FIG. 4.

FIG. 5 shows a top view of an exemplary transmissive pattern mask 5, which can be used in the optical device 1 according to FIG. 4. In the example of FIG. 5 the patterns are arranged in two separate sections 30 of the pattern mask 5. Each section 30 forms a regular gird of patterns. Each pattern within a respective section 30 is spaced from neighboring patterns such that all patterns are distributed over the pattern mask 5. Each pattern forms an individual image 4 in the imaging plane 3.

Figure 6:
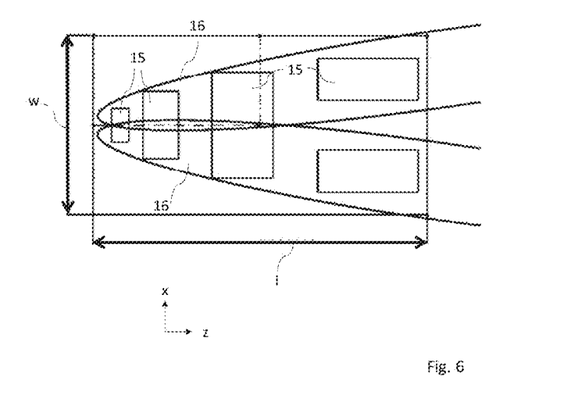
FIG. 6 shows an overall projection on an inclined surface according to the embodiment of FIG. 4.

FIG. 6 shows the respective overall projection 15 according to the pattern mask 5 of FIG. 5. The overall projection 15 is projected onto the projection plane, wherein the projection plane is tilted with respect to the imaging plane 3 (see FIG. 4). In this example, the overall projection 15 is formed by five rectangles. FIG. 6 further shows the profile of the two light cones 16 that are formed by the first and second subset 24, 27 of channels of light beams 12 directed onto the projecting plane 13 and generating the overall projection 15. The two light cones 16 overlap, so that they can be regarded as one global light cone 16.

The length l of the overall projection 15 of FIG. 6 is equal to the length l of the overall projection 15 of FIG. 3. However, the width w of the overall projection 15 of that embodiment is wider, since the global light cone 16 has a larger cone angle. Therefore, the embodiment according to FIGS. 4 to 6 has a larger field of illumination than the example according to FIGS. 1 to 3. This means that the FOI can be expanded by means of the optical expander 17.

Figure 7:
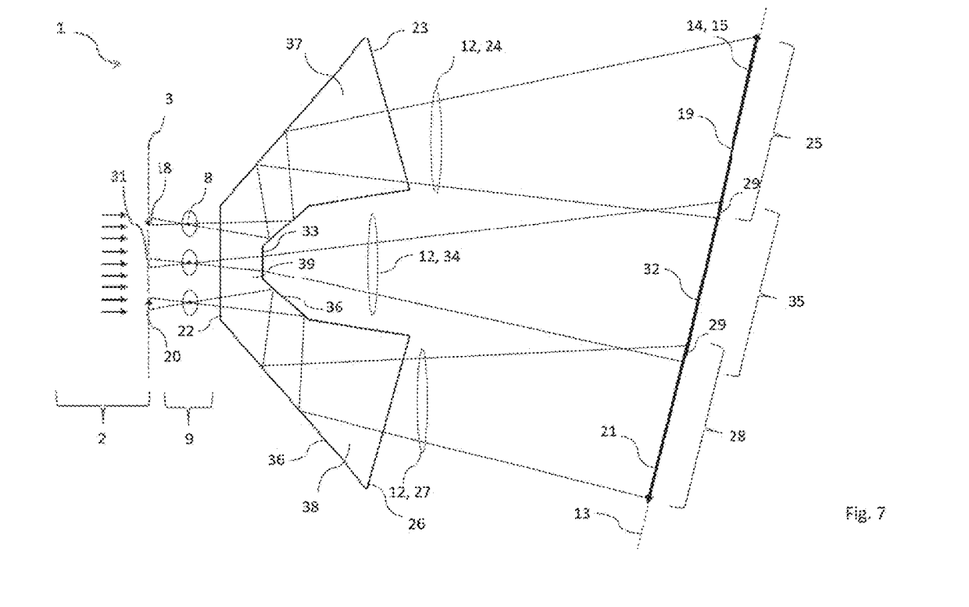
FIG. 7 shows a cross-section of another embodiment of an optical device.

FIG. 7 shows a cross-section of another embodiment of the optical device 1. The functional principle of the embodiment according to FIG. 7 is similar to that of the embodiment according to FIG. 4. Therefore, elements according to FIG. 7 that correspond to elements of the embodiment according to FIG. 4 are designated with the same reference numerals.

FIG. 7 shows three individual images 4, however, the number is merely exemplary. Correspondingly, FIG. 7 shows three micro-lenses 8 of the MLA 9, which form respective channels of light beams 12 by projecting the respective individual image 4 towards the projecting plane 13.

As in the embodiment of FIG. 4, the individual images 4 differ from each other not only in being distorted with respect to each other. A first subset 18 of individual images 4, which is represented by the upper individual image 4 shown in FIG. 7, shows versions of a first part 19 of the overall projection 15. A second subset 20 of individual images 4, which is represented by the lower individual image 4, shows versions of a second part 21 of the overall projection 15. A third subset 31 of individual images 4, which is represented by the middle individual image 4, shows versions of a third part 32 of the overall projection 15.

The optical expander 17 of the embodiment of FIG. 7 comprises an input surface 22 facing the MLA 9 and three output surfaces 23, 26, 33 facing the projecting plane 13. The optical expander 17 is arranged such that the input surface 22 is parallel to the imaging plane 3 and receives the channels of light beams 12 coming from the MLA 9.

Moreover, the optical expander 17 is arranged such that the first output surface 23 of the three output surfaces 23, 26, 33 directs the first subset 24 of channels of light beams 12 to a first subarea 25 of the projecting plane 13. The first subset 24 of channels of light beams 12 corresponds to the channels of light beams 12 which are formed by projecting the first subset 18 of individual images 4 by means of the MLA 9.

The second output surface 26 of the three output surfaces 23, 26, 33 directs the second subset 27 of channels of light beams 12 to the second subarea 28 of the projecting plane 13, wherein the second subset 27 of channels of light beams 12 corresponds to the channels of light beams 12 which are formed by projecting the second subset 20 of individual images 4 by means of the MLA 9.

A third output surface 33 of the three output surfaces 23, 26, 33 directs a third subset 34 of channels of light beams 12 to a third subarea 35 of the projecting plane 13, wherein the third subset 34 of channels of light beams 12 corresponds to the channels of light beams 12 which are formed by projecting the third subset 31 of individual images 4 by means of the MLA 9.

Starting from the optical expander 17, the first, the second and the third subareas 25, 28, 35 of the projecting plane 13 are in different directions. Thus, the optical expander 17 fans out the channels of light beams 12. In the embodiment of FIG. 7 fanning out and directing the channels of light beams 12 takes place by total internal reflection within the optical expander 17. Therefore, the optical expander 17 comprises further surfaces 36 enabling total internal reflection of light beams within sections 37, 38 of the optical expander 17.

The optical expander 17 of FIG. 7 comprises a first section 37 where the first subset 24 of channels of light beams 12 is guided by TIR towards the first output surface 23. This first section 37 comprises two further surfaces 36, so that the first subset 24 of channels of light beams 12 is internally deflected twice before reaching the first output surface 23.

The optical expander 17 further comprises a second section 38 where the second subset 27 of channels of light beams 12 is guided by TIR towards the second output surface 26. This second section 38 also comprises two further surfaces 36, so that the second subset 27 of channels of light beams 12 is internally deflected twice before reaching the second output surface 26. The number of sections 37, 38, where TIR takes place, is arbitrary, so that the number of sections in this embodiment is merely an example.

The third subset 34 of channels of light beams 12 exit the optical expander 17 at the third output surface 33 in a center part 39 of the optical expander 17. In the example of FIG. 7 this subset is not deflected internally.

As in the embodiment according to FIGS. 4 to 6, individual projections 14 of the individual images 4 are formed on the projection plane by the channels of light beams 12 directed onto the projection plane, where they are superimposed at least partially. In the embodiment of FIG. 7 the first, the second and the third subarea 25, 28, 35 of the projecting plane 13 are different but overlap, so that two overlap regions 29 are formed. There, the different subsets of channels of light beams 12 are superimposed with each other as well.

Figure 8:
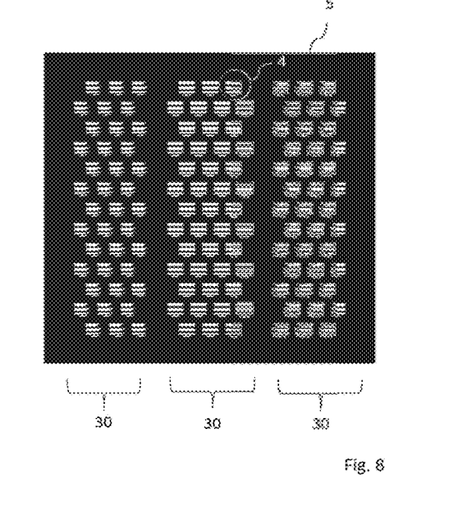
FIG. 8 shows a top-view of a pattern mask according to the embodiment of FIG. 7.

FIG. 8 shows a top view of an exemplary transmissive pattern mask 5, which can be used for the optical device 1 according to FIG. 7. In the example of FIG. 8 the patterns are arranged in three separate sections 30 of the pattern mask 5. Each section 30 forms a regular gird of patterns. Each pattern within a respective section 30 is spaced from neighboring patterns such that all patterns are distributed over the pattern mask 5. Each pattern forms an individual image 4 in the imaging plane 3.

Figure 9:
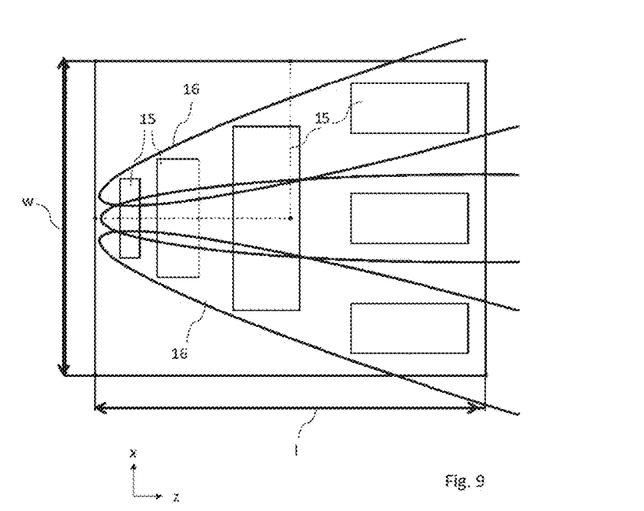
FIG. 9 shows an overall projection on an inclined surface according to the embodiment of FIG. 7.

FIG. 9 shows the respective overall projection 15 according to the pattern mask 5 of FIG. 8. The overall projection 15 is projected on the projection plane, wherein the projection plane is tilted with respect to the imaging plane 3 (see FIG. 7). In this example, the overall projection 15 is formed by six rectangles. FIG. 9 further shows the profile of the three light cones 16 that are formed by the first, the second and the third subset 24, 27, 34 of channels of light beams 12 directed onto the projecting plane 13 and generating the overall projection 15. The three light cones 16 overlap, so that they can be regarded as one global light cone 16.

The length l of the overall projection 15 of FIG. 9 is equal to the length l of the overall projection 15 of FIGS. 3 to 6. However, the width w of the overall projection 15 of that embodiment is even wider than in FIG. 6, since the global light cone 16 has a larger aperture angle. Therefore, the embodiment according to FIGS. 7 to 9 has a larger field of illumination than the embodiment according to FIGS. 4 to 6. This means that the FOI can be further expanded by means of the optical expander 17 that enables TIR.

Figure 10:
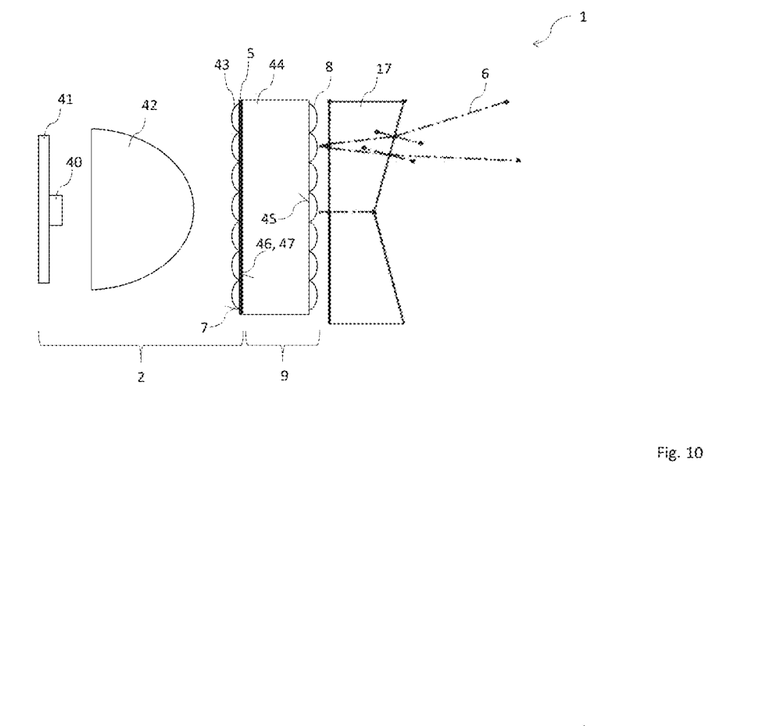
FIG. 10 shows a cross-section of another embodiment of an optical device.

FIG. 10 shows a cross-section of another embodiment of the optical device 1. The optical device 1 comprises an imaging system 2 comprising a light source 40 that is mounted on a carrier 41. The imaging system 2 further comprises a collimator lens 42 arranged in front of the light source 40, so that the collimator lens 42 can generate an approximately parallel beam path of light from the light source 40. The collimator lens 42 is arranged between the light source 40 and an array of condenser lenses 43.

The condenser lenses are provided to ensure that each individual image 4 is uniformly illuminated. Therefore, the array of condenser lenses 43 is attached to the rear side 7 of the pattern mask 5. The array of condenser lenses 43 can be attached to the pattern mask 5 in such a way that each condenser lens covers a respective individual image 4.

The optical device 1 according to FIG. 10 further comprises a transparent substrate 44 with a main plane of extension which is parallel to the imaging plane 3 and the pattern mask 5, respectively. The substrate 44 comprises a top side 45, where the MLA 9 is arranged on. The MLA 9 is in direct contact with the substrate 44. On a rear side 46 of the substrate 44 the pattern mask 5 with the array of condenser lenses 43 is arranged. A front side 47 of the pattern mask 5 is in direct contact with the rear side 46 of the substrate 44. This means that the shown embodiment of the optical device 1 has a compact design, in which parts of the imaging system 2, i.e. the array of condenser lenses 43 and the pattern mask 5, are attached to the substrate 44 including the MLA 9.

The optical device 1 according to FIG. 10 further comprises an optical expander 17 similar to the optical expander 17 shown in FIG. 4. Two exemplary light beams 6 are shown to illustrate the light beam refraction at one of the output surfaces 23, 26 of the optical expander 17.

Figure 11:
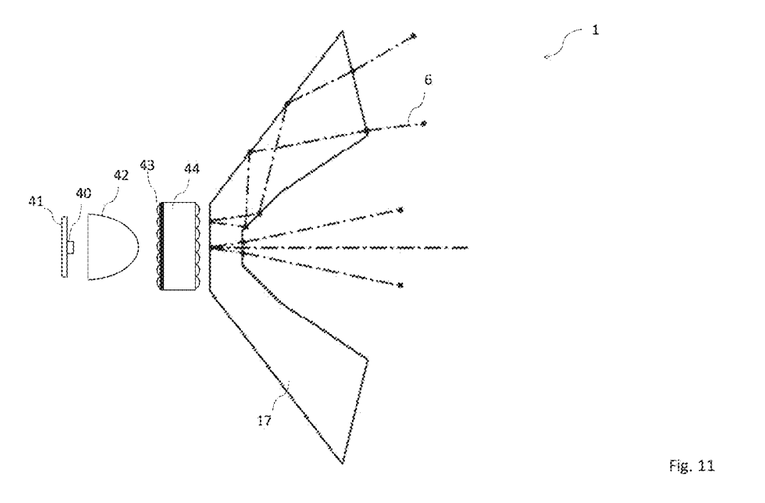
FIG. 11 shows a cross-section of another embodiment of an optical device.

FIG. 11 shows a cross-section of another embodiment of the optical device 1. That embodiment differs from the embodiment according to FIG. 10 in that it comprises an optical expander 17, which is similar to the optical expander 17 shown in FIG. 7. Several light beams 6 are depicted to illustrate the total internal reflection of light beams within sections of the optical expander 17. In the center part 39 of the optical expander 17 light beams exit the optical expander 17 without being reflected.

Figure 12A:
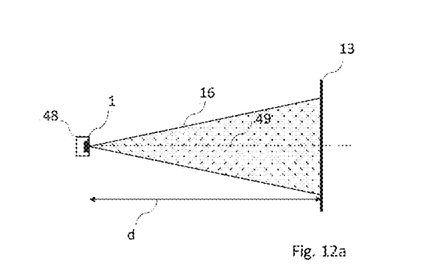
FIG. 12a-c show schematics of exemplary projecting planes according to an embodiment.
Figure 12B:
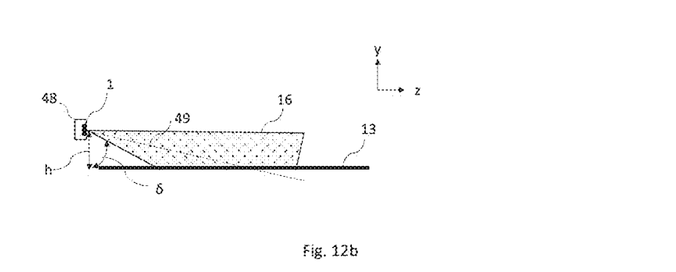
Figure 12C:
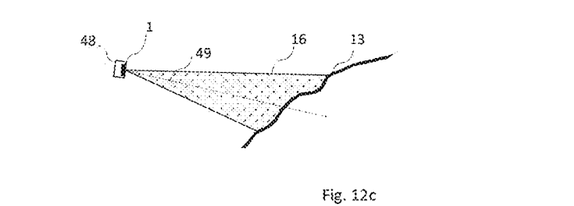

FIGS. 12a to 12c each show an optical apparatus 48 comprising the optical device 1 according to FIGS. 4 to 11. The optical apparatus 48 may be, for example, a projector or an illuminator. The optical apparatus 48 may comprise a housing in which the optical device 1 is integrated.

In FIG. 12a an optical apparatus 48 is shown, which illuminates and/or projects onto a parallel, i.e. not inclined, projecting plane 13, for example a screen. This means that a normal vector of the projecting plane 13 is parallel to an optical axis 49 of the light cone 16 emanated by the optical apparatus 48. The projecting plane 13 is spaced from the optical apparatus 48 by a distance d.

In FIG. 12b an optical apparatus 48 is shown, which illuminates and/or projects onto an inclined projecting plane 13, for example a screen or the ground. This means that a normal vector of the projecting plane 13 is transverse to an optical axis 49 of the light cone 16 emanated by the optical apparatus 48. An angle 5 between the normal vector of the projecting plane 13 and the optical axis 49 of the light cone 16 depends on the application. For example, if the optical apparatus 48 is used for a welcome-light-carpet in automotive applications, the angle 5 is typically between 65 degree and 85 degree. In a vertical direction y, which is perpendicular to the projecting plane 13, the optical apparatus 48 can be spaced from the projecting plane 13 by a height h. For example, if the optical apparatus 48 is used for a welcome-light-carpet in automotive applications, the height h is typically between 150 mm and 270 mm.

In FIG. 12c an optical apparatus 48 is shown, which illuminates and/or projects onto a projecting plane 13, which forms a freeform surface. This means that the projecting plane 13 is non-planar.

The embodiments of the optical device 1 disclosed herein have been discussed for the purpose of familiarizing the reader with novel aspects of the idea. Although preferred embodiments have been shown and described, many changes, modifications, equivalents and substitutions of the disclosed concepts may be made by one having skill in the art without unnecessarily departing from the scope of the claims.

It will be appreciated that the disclosure is not limited to the disclosed embodiments and to what has been particularly shown and described hereinabove. Rather, features recited in separate dependent claims or in the description may advantageously be combined. Furthermore, the scope of the disclosure includes those variations and modifications, which will be apparent to those skilled in the art and fall within the scope of the appended claims.

The term "comprising", insofar it was used in the claims or in the description, does not exclude other elements or steps of a corresponding feature or procedure. In case that the terms "a" or "an" were used in conjunction with features, they do not exclude a plurality of such features. Moreover, any reference signs in the claims should not be construed as limiting the scope.

The invention claimed is:

1. An optical device, comprising:
    an imaging system provided to generate a plurality of images being distributed over an imaging plane,
    a micro-lens-array, MLA, wherein micro-lenses of the MLA are assigned to respective individual images of the plurality of images and are provided to form respective channels of light beams by projecting the respective individual images towards a projecting plane,
    an optical expander being arranged between the MLA and the projecting plane, the optical expander comprising an input surface facing the MLA and at least two output surfaces facing the projecting plane, the optical expander being provided to fan out and direct the channels of light beams onto the projecting plane, such that
    individual projections of the individual images are formed on the projection plane by the channels of light beams directed onto the projection plane, and
    an overall projection is formed on the projection plane by superimposing the individual projections at least partially,
    wherein at least two of the output surfaces of the optical expander are tilted with respect to each other.

2. The optical device according to the claim 1, wherein the optical expander is arranged such that the input surface is parallel to the imaging plane and receives the channels of light beams coming from the MLA.

3. The optical device according to claim 1, wherein the optical expander is arranged such that
    a first output surface of the optical expander is provided to direct a first subset of channels of light beams to a first subarea of the projecting plane, and
    a second output surface of the optical expander is provided to direct a second subset of channels of light beams to a second subarea of the projecting plane.

4. The optical device according to claim 1, wherein the optical expander comprises at least one further output surface, which is provided to direct a further subset of channels of light beams to a further subarea of the projecting plane.

5. The optical device according to claim 1, wherein at least one of the output surfaces of the optical expander is provided to direct the respective subset of channels of light beams by light beam refraction at the respective output surface.

6. The optical device according to claim 3, wherein the optical expander comprises further surfaces enabling total internal reflection of light beams within sections of the optical expander, such that at least one of the subsets of channels of light beams is deflected within the sections of the optical expander.

7. The optical device according to claim 1, wherein at least one of the output surfaces of the optical expander is tilted with respect to the input surface of the optical expander.

8. The optical device according to claim 3, wherein the optical expander is provided for expanding the field of illumination such that the overall projection on the projection plane is larger than the individual projections on one of the subareas of the projection plane.

9. The optical device according to claim 1, wherein the imaging system comprises a pattern mask arranged in the imaging plane, the pattern mask providing individual images distributed over the imaging plane.

10. The optical device according to claim 1, wherein the imaging system comprises
a light source being provided to display the plurality of images,
a collimator lens, and
a condenser lens or an array of condenser lenses,
the collimator lens and the condenser lens or the array of condenser lenses being provided to form a beam path of the light source.

11. The optical device according to claim 1, wherein the MLA further comprises a substrate, the substrate having a main plane of extension being parallel to the imaging plane and comprising a rear side facing the imaging plane and a top side facing the optical expander, wherein the micro-lenses of the MLA are arranged on the top side of the substrate.

12. The optical device according to claim 1, wherein the projecting plane is tilted with respect to the imaging plane or wherein the projecting plane is a freeform surface.

13. An optical apparatus comprising the optical device according to claim 1, wherein the optical apparatus is an illuminator or a projector.

14. The optical device according to claim 1, wherein the imaging system comprises
a light source being provided to display the plurality of images;
a collimator lens;
a condenser lens; or
an array of condenser lenses,
the collimator lens or the condenser lens or the array of condenser lenses being provided to form a beam path of the light source.

15. A method for forming an overall projection, the method comprising:
generating a plurality of images being distributed over an imaging plane,
assigning micro-lenses of a micro-lens-array, MLA, to respective individual images of the plurality of images and forming respective channels of light beams by projecting the respective individual images towards a projecting plane,
providing an optical expander and arranging the optical expander between the MLA and the projecting plane, the optical expander comprising an input surface facing the MLA and at least two output surfaces facing the projecting plane, the optical expander fanning out and directing the channels of light beams onto the projecting plane,
forming individual projections of the individual images on the projection plane by the channels of light beams directed onto the projecting plane, and
superimposing the individual projections at least partially, wherein at least two of the output surfaces of the optical expander are tilted with respect to each other.

* * * * *